United States Patent [19]

Thayer

[11] Patent Number: 5,267,695
[45] Date of Patent: Dec. 7, 1993

[54] VERTICALLY HANGING, LOW VOLUME IRRIGATION ASSEMBLY AND METHOD

[76] Inventor: Susan S. Thayer, 3808 Gaines Cove Dr., Winter Haven, Fla. 33884

[21] Appl. No.: 579,727

[22] Filed: Sep. 10, 1990

[51] Int. Cl.$^5$ .................. B05B 1/20; B05B 15/06
[52] U.S. Cl. .................... 239/566; 239/548; 239/588
[58] Field of Search ............. 239/542, 548, 566, 588

[56] References Cited

U.S. PATENT DOCUMENTS

| | | | |
|---|---|---|---|
| 3,235,187 | 2/1966 | Merritt | 239/588 |
| 3,478,967 | 11/1969 | Horton et al. | 239/588 |
| 3,876,146 | 4/1975 | Pacheco | 239/542 X |
| 4,037,791 | 7/1977 | Mullett et al. | 239/542 |
| 4,223,840 | 9/1980 | LaScala et al. | 239/542 X |
| 4,676,438 | 6/1987 | Sesser | 239/542 X |
| 4,771,947 | 9/1988 | Smeller et al. | 239/542 X |
| 4,795,100 | 1/1989 | Purtell et al. | 239/588 X |
| 4,938,420 | 7/1990 | Ruttenberg | 239/542 X |

FOREIGN PATENT DOCUMENTS 2728263 1/1979 Fed. Rep. of Germany ...... 239/542

*Primary Examiner*—Andres Kashnikow
*Assistant Examiner*—William Grant
*Attorney, Agent, or Firm*—Allen, Dyer, Doppelt, Franjola & Milbrath

[57] ABSTRACT

A low volume irrigation system includes a length of a thin-walled plastic distribution tube extending horizontally along a row of plants with a plurality of vertical hand assemblies extending downwardly from and spaced along the distribution tube, each hang assembly having a lowermost sprinkler and an intermediate feed tube for delivering water from the distribution tube to the sprinkler. Each hang assembly is made from a material that is selected to maintain the sprinkler of each hang assembly located generally underneath the distribution tube, irrespective of any axial twisting of the tube.

4 Claims, 2 Drawing Sheets

VERTICALLY HANGING, LOW VOLUME IRRIGATION ASSEMBLY AND METHOD

BACKGROUND OF THE INVENTION

The present invention relates generally to irrigation techniques, and more specifically to low volume irrigation systems and methods.

Because of increasing water shortages in agricultural areas, there has been used in the past techniques known as "low volume irrigation". Low volume irrigation techniques employ small volumes of water which are generally emitted adjacent the base of the agricultural plants. In some low volume irrigation systems, a central water distribution line is buried underground down a row, with individual low volume trickle emitters or micro spray jets being fed through tubing from the central line via individual lines for irrigation at the ground level of each plant or group of plants.

There are some agricultural plots, such as grape vineyards and apple orchards, because of the root structure and growing pattern of the plants, do not lend themselves well to a buried feedline-type of low volume irrigation system. Accordingly, in those situations it is known to run the central irrigation distribution tube above the base of the plants in a grape vineyard or apple orchard, with low-volume sprinklers or emitters hanging downwardly from the central distribution tube line. In use, these types of vertically hanging low volume arrangements sprinkle the water downwardly onto the base of the plants for irrigation. Since it is customary to run the central distribution tube directly down the row of plants via stakes immediately adjacent to the grape plant or apple tree, then a hanging low volume sprinkler assembly connected to the distribution tube will generally direct the water downwardly to the base of the plant in the intended manner. However, it is customary to employ a thin wall plastic tube for the central distribution line. Because of weather and other conditions, such distribution tubes will often twist or turn about their own axial direction. As a result, many of the hanging low volume sprinkler assemblies will be displaced from the desired position to give the maximum irrigation benefit to the base of the adjacent plants The vertical hanging low volume sprinkler assemblies used in the past have employed plastic tubing made from the same material as the distribution tube, and is relatively stiff; therefore, any axial twisting of the central feedline tends to exacerbate the displacement of the desired spray pattern, because the stiffness of prior art hanging assembly causes the assembly to extend radially outwardly away from the desired downward direction.

FIGS. 1 and 2 illustrate the above-described difficulties with prior art overhead, vertically hanging low volume irrigation systems. In FIG. 1, a prior art system is referred to generally by the reference numeral 10, and is used for example, to irrigate a grape vineyard, including grape vines 12. Associated with each vine 12 is a stake 14 to which is attached a central distribution tube 16 fabricated of a thin wall plastic material; typically, the plastic, usually comprises polyethylene. A plurality of low volume hanging spray assemblies are attached to the horizontal distribution tube 16, each assembly including an intermediate feed tube 18, a weight 20 and a sprinkler or emitter 22. Desirably, each hanging assembly extends downwardly between two of the grapevines 12, and thus is capable of irrigating the base of two adjacent plants.

However, as is shown with two of the assemblies on the left hand side of FIG. 1 and in cross section in FIG. 2, often times the central distribution tube 16 is subjected to axial twisting caused by weather conditions, improper installation and the like. Heretofore, the intermediate feed tube 18 has been fabricated in the prior art from materials which are essentially identical to the material of the central distribution tube 16. However, such materials are relatively stiff, even when the weight 20 is attached at the end of the assembly adjacent the emitter 22. As a result, the axial twisting of the central distribution tube 16 causes the relatively stiff intermediate tubes 18 to extend outwardly as shown in FIG. 2, thus dislocating the desired spray pattern 24 in the manner shown in FIG. 1. As a consequence, efficiency of the irrigation system is markedly reduced.

SUMMARY OF THE INVENTION

The problems with vertical hanging, low volume irrigation assemblies and methods described above are solved in the present invention by utilizing with the hanging assembly an intermediate feed tube which has sufficient flexibility, either alone or preferably together with a weight attached at the outer extremity of that intermediate tube, to maintain the desired generally vertical positioning of the low volume emitter at the end of the vertical hanging assembly, irrespective of any axial twisting of the central distribution tube.

In order to achieve these ends, the intermediate feed tube is preferably fabricated from P.V.C. vinyl, or a similar material having sufficient flexibility in order to bend under its own weight, or with an added weight, through an angle of at least 90 degrees, in order to maintain the desired vertical location of the low volume irrigation emitter at the end of the intermediate feed tube.

THE DRAWINGS

DETAILED DESCRIPTION OF THE PREFERRED EMBODIMENT

Figure 1:
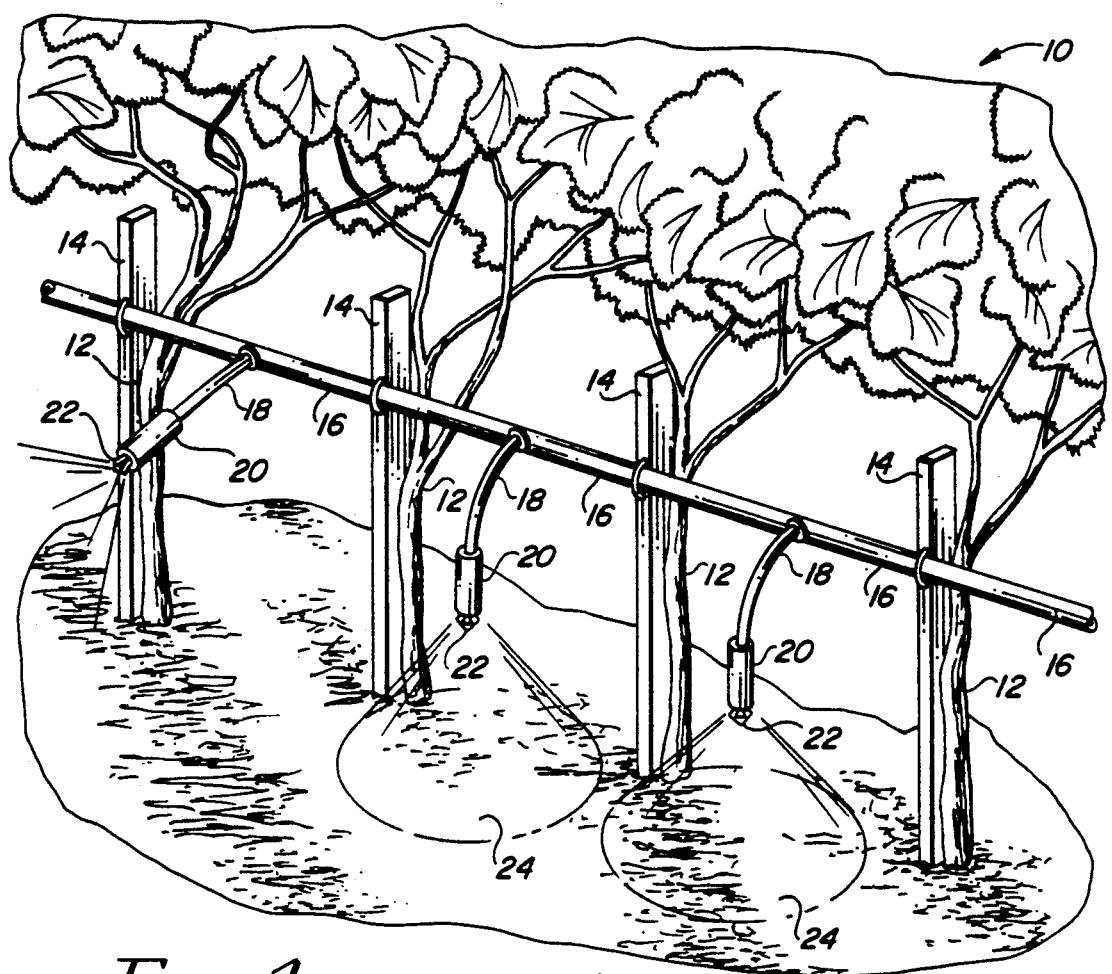
FIG. 1 is a perspective view.
Figure 2:
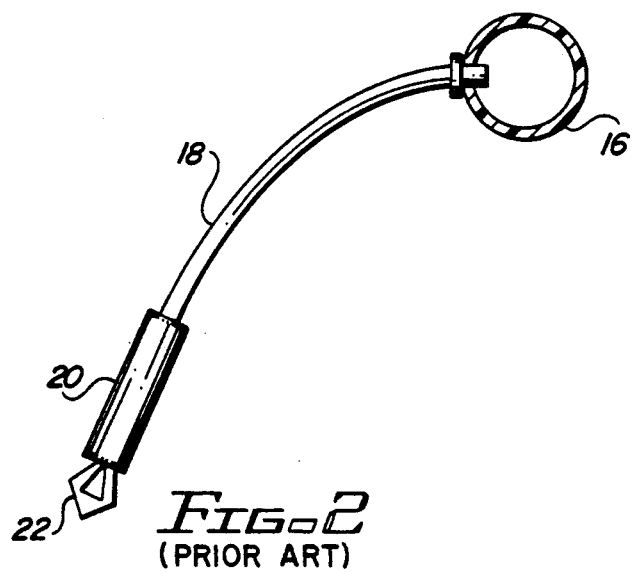
FIG. 2 is a cross sectional end view, illustrating a prior art vertically hanging low volume irrigation system experiencing the axial twisting difficulties described above.
Figure 3:
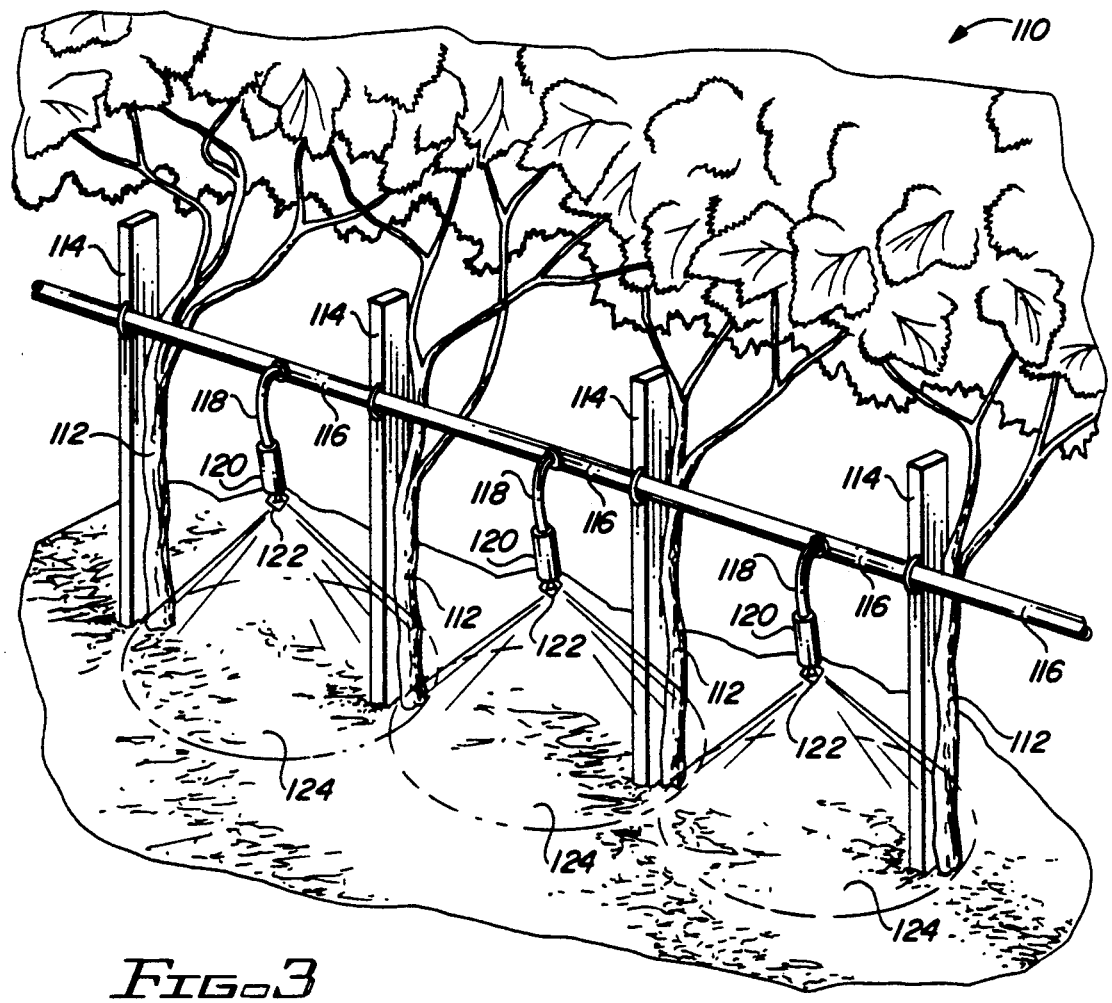
FIGS. 3 and 4 are perspective and cross sectional end views, respectively, like that of FIGS. 1 and 2, which illustrate the benefits of the present invention.
Figure 4:
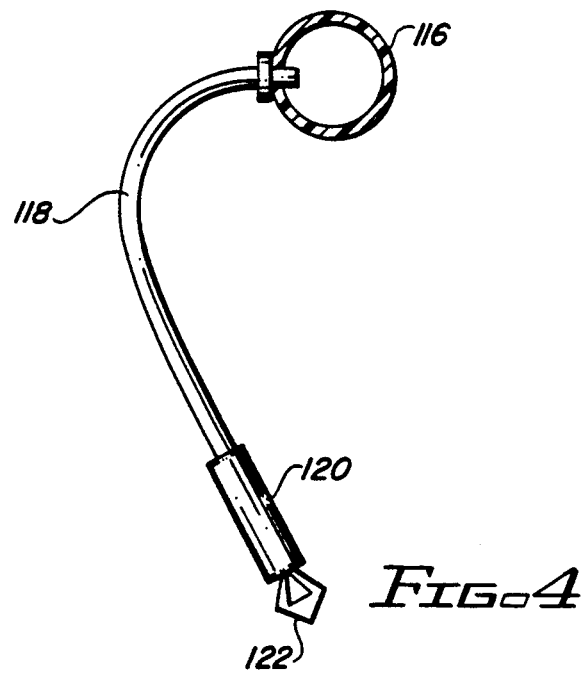

A preferred embodiment of the present invention will now be described with reference to FIGS. 3 and 4. In FIG. 3, the overall irrigation system is referred to generally by the reference numeral 110. In accordance with the present invention, each hanging low volume sprinkler assembly includes a highly flexible intermediate feed tube 118, a weight 120 and sprinkler head 122. As shown in FIG. 4, the intermediate feed tube 118 is fabricated from a material which is sufficiently flexible so as to bend through an angle of at least 90 degrees either under its own weight or with added weight 120, in order to maintain the generally vertical configuration with the sprinkler head 122 underneath the central feed tube 116, irrespective of any axial twisting of the distribution tube 116. In a preferred embodiment, the intermediate feed tube 118 is fabricated from P.V.C. vinyl, which has the desired degree of flexibility to achieve this end. A suitable P.V.C. vinyl is sold by Bayshore Vinyl Compounds, Inc., Keyport, N.J., under Compound No. BVC 6200-75. This product has a durometer rating (Shore "A") of 75, a specific gravity of 1.42, a tensile strength of 1800 p.s.i., an elongation factor of 320%, a 100% modulus characteristic of 750 p.s.i., and a brittle temperature of minus 40° C. It will also be understood that the addition of the weight 120 further insures that the flexible intermediate tube 118 bends sufficiently downward to insure that the sprinkler 122 is positioned underneath the central distribution tube 116, in order to obtain the desired spray pattern configuration. It will of course be appreciated by those skilled in the art that other, highly flexible plastic materials may be used in lieu of P.V.C. vinyl for the intermediate feed tube; for example, low density polyethylene, rubber and thermoplastic rubber are also suitable.

It will thus be appreciated by those skilled in the art that the present invention achieves a uniformity of spray pattern as shown at 124 in FIG. 3 for vertically hanging, low volume sprinklers 122, irrespective of any axial twisting of the central distribution tube 116.

What is claimed is:

1. A low volume irrigation system comprising:
    a length of a thin wall central plastic distribution tube;
    means for horizontally suspending the length of distribution tube above a row of plants;
    a plurality of hang assemblies extending downwardly from and spaced along the distribution tube, each hang assembly having a lowermost sprinkler, a weight positioned adjacent the sprinkler and an intermediate feed tube extending through the weight to the sprinkler for delivering water from the distribution tube to the sprinkler; and
    means including the intermediate feed tube having sufficient length and formed of a plastic material having sufficient flexibility to bend through at least 90 degrees with only the weight thereon, and when supported only at an end of the intermediate tube opposite the weight and sprinkler for maintaining the sprinkler of each hang assembly generally below the central distribution tube, irrespective of any axial twisting of the distribution tube.

2. A low volume irrigation system comprising:
    a length of a thin-walled plastic distribution tube;
    means for horizontally suspending the length of distribution tube above a row of plants;
    a plurality of hang assemblies extending downwardly from and spaced along the distribution tube, each hang assembly having a lowermost sprinkler and an intermediate feed tube for delivering water from the distribution tube to the sprinkler;
    a weight along each hang assembly intermediate tube positioned adjacent the sprinkler, with the intermediate feed tube extending through the weight to the sprinkler; and
    means with the weight and including the intermediate feed tube having sufficient length and formed of a plastic material having sufficient flexibility to bend through at least 90 degrees with only the weight thereon, and when supported only at an end of the intermediate tube opposite the weight and sprinkler for maintaining the sprinkler of each hang assembly located generally underneath the distribution tube, irrespective of any axial twisting of the distribution tube.

3. An assembly for use in a vertically hanging irrigation system comprising:
    a sprinkler;
    a weight positioned adjacent the sprinkler;
    an intermediate feed tube extending through the weight to the sprinkler, the intermediate feed tube having sufficient length and formed of a plastic material having sufficient flexibility to bend through at least 90 degrees with only the weight thereon, and when supported only at an end of the intermediate tube opposite the weight and sprinkler.

4. A method for reducing spray pattern misalignment in an irrigation system employing a horizontal, thin-walled plastic distribution tube and plural hanging spray assemblies extending downwardly from the horizontal distribution tube, with each spray assembly having a sprinkler at its extremity, and a weight positioned adjacent the sprinkler, the method comprising the steps of providing an intermediate feed tube extending through the weight to the sprinkler, the intermediate feed tube having sufficient length and formed of a plastic material having sufficient flexibility to bend through at least 90 degrees with only the weight thereon, and when supported only at an end of the intermediate tube opposite the weight and sprinkler and maintaining each of the hanging spray assemblies generally vertically and extending downwardly with the sprinkler of each spray assembly generally underneath the horizontal distribution tube, irrespective of any axial twisting of the horizontal distribution tube from which all of the hanging spray assemblies extend.

* * * * *